United States Patent
Yeh

(10) Patent No.: US 11,599,208 B2
(45) Date of Patent: Mar. 7, 2023

(54) TOUCH SENSITIVE PROCESSING APPARATUS AND METHOD AND SYSTEM FOR DETECTING ELECTRONIC BOARD ERASER

(71) Applicant: EGALAX_EMPIA TECHNOLOGY INC., Taipei (TW)

(72) Inventor: Shang-Tai Yeh, Taipei (TW)

(73) Assignee: EGALAX_EMPIA TECHNOLOGY INC., Taipei (TW)

( * ) Notice: Subject to any disclaimer, the term of this patent is extended or adjusted under 35 U.S.C. 154(b) by 0 days.

(21) Appl. No.: 17/407,507

(22) Filed: Aug. 20, 2021

(65) Prior Publication Data

US 2021/0382568 A1 Dec. 9, 2021

Related U.S. Application Data

(63) Continuation of application No. 16/201,442, filed on Nov. 27, 2018, now abandoned.
(Continued)

(51) Int. Cl.
*G06F 3/039* (2013.01)
*G06F 3/0354* (2013.01)
(Continued)

(52) U.S. Cl.
CPC ........ *G06F 3/03545* (2013.01); *G06F 1/3231* (2013.01); *G06F 1/3259* (2013.01);
(Continued)

(58) Field of Classification Search
CPC .... G06F 3/03545; G06F 3/039; G06F 3/0416; G06F 1/3259; G06F 1/3231;
(Continued)

(56) References Cited

U.S. PATENT DOCUMENTS 5,023,408 A * 6/1991 Murakami ............... G06F 3/046
345/173
6,473,072 B1 * 10/2002 Comiskey ........... G02F 1/16757
345/173

(Continued)

FOREIGN PATENT DOCUMENTS

| CN | 106055127 | 10/2016 |
| TW | 201533616 | 9/2015 |

*Primary Examiner* — Carolyn R Edwards
(74) *Attorney, Agent, or Firm* — WPAT, PC

(57) ABSTRACT

The present invention provides a touch sensitive processing apparatus for detecting an electronic board eraser. The touch sensitive processing apparatus connects to a touch panel. The touch panel includes parallel first electrodes and parallel second electrodes, each of the first electrodes intersects with the second electrodes to form multiple intersection areas. The touch sensitive processing apparatus includes: a driving circuit connecting to the first electrodes; a sensing circuit connecting to the first electrodes and the second electrodes; and a processor connecting to the driving circuit and the sensing circuit. Wherein the processor is configured to execute a program module for realizing the following steps: having the driving circuit emit a beacon signal via the first electrodes simultaneously; and having the sensing circuit detect electrical signal emitted from at least three eraser electrodes of the electronic board eraser via the first and the second electrodes after a time period since the beacon signal is emitted.

13 Claims, 14 Drawing Sheets

Related U.S. Application Data

(60) Provisional application No. 62/591,235, filed on Nov. 28, 2017.

(51) Int. Cl.
*G06F 3/038* (2013.01)
*G06F 1/3231* (2019.01)
*G06F 1/3234* (2019.01)
*G06F 3/041* (2006.01)

(52) U.S. Cl.
CPC ............ *G06F 3/039* (2013.01); *G06F 3/0383* (2013.01); *G06F 3/0416* (2013.01)

(58) Field of Classification Search
CPC .... G06F 3/0383; G06F 1/3228; G06F 3/0488; G06F 3/0414; H02J 7/025; B43L 21/00
See application file for complete search history.

(56) References Cited

U.S. PATENT DOCUMENTS

| | | | |
|---|---|---|---|
| 9,977,519 B2 | 5/2018 | Lukanc et al. | |
| 2010/0182284 A1* | 7/2010 | Tremblay | G06F 3/038 345/179 |
| 2011/0080378 A1* | 4/2011 | Hsu | G06F 1/32 345/179 |
| 2012/0182254 A1* | 7/2012 | Jang | G06F 3/0442 345/174 |
| 2012/0293425 A1* | 11/2012 | Lee | G06F 3/0488 345/173 |
| 2015/0002412 A1* | 1/2015 | Yoo | G06F 3/0383 345/173 |
| 2015/0242003 A1* | 8/2015 | Chang | G06F 3/03545 345/179 |
| 2018/0101272 A1* | 4/2018 | Xi | G06F 3/042 |
| 2019/0302966 A1* | 10/2019 | Yoshino | G06F 3/0416 |
| 2020/0023671 A1* | 1/2020 | Boettcher | B43L 19/0062 |

* cited by examiner

TOUCH SENSITIVE PROCESSING APPARATUS AND METHOD AND SYSTEM FOR DETECTING ELECTRONIC BOARD ERASER

CROSS REFERENCE TO RELATED APPLICATIONS

This application is a continuation application of U.S. patent application Ser. No. 16/201,442, filed on Nov. 27, 2018, which claims priority to U.S. provisional patent application, 62/591,235, filed on Nov. 28, 2017, the disclosures of which are incorporated herein by reference.

BACKGROUND OF THE INVENTION

1. Field of the Invention

The present invention relates to the field of electronic board eraser, and more particularly, to an electronic board eraser and system thereof of which using experience is like that of a traditional eraser.

2. Description of the Prior Art

Blackboards or whiteboards are common tools used in traditional teaching. Users can use marker to write on the whiteboard and use eraser to erase marker's handwriting. Some manufacturers have made electronic whiteboard, which allows users to use stylus to move on it. The electronic whiteboard can sense tip position of stylus and display handwriting on electronic whiteboard to simulate the writing of the marker on the whiteboard. When users want to erase a part of the electronic whiteboard, settings of the stylus need to be changed, switching the marker mode to the eraser mode. However, compared with the traditional eraser, tip area of stylus is very small and is unable to erase a large area of mark. This is difficult for users to make use of the electronic whiteboard. Accordingly, it is necessary to have a device, which can simulate a traditional eraser, so that users can easily erase the larger area of the electronic whiteboard.

SUMMARY OF THE INVENTION

According to an embodiment of the present invention, it provides an electronic board eraser including: a case; a wiping surface connecting to the case; at least three eraser electrodes; a driving circuit connecting to the at least three eraser electrodes; a sensing electrode; a sensing circuit connecting to the sensing electrode; and a processor connecting to the driving circuit and the sensing circuit, wherein the processor is configured to execute a program module for realizing the following steps: having the sensing circuit sense a beacon signal emitted from a touch panel; and having the driving circuit provide electrical signals to the at least three eraser electrodes after a time period since the beacon signal is emitted.

In the embodiment, for easy cleaning, the case and the wiping surface are constituted by waterproof material, and make the processor, the sensing circuit and the driving circuit be inside an inner space of the case and the wiping surface.

In the embodiment, for transmitting the state(s), it further includes at least one input device connecting to the processor, wherein after a state of the input device changes, the electrical signals also change correspondingly. In the embodiment, for detecting different inputs or states, the input device includes one of the following device types: button, touch button, roller, multi-stage switch, accelerometer, gyroscope, moving sensor and other devices.

In the embodiment, for saving power, the processor enters a power-saving mode from a working mode when the input device detects the electronic board eraser being in still for a period, the processor retrieves the working mode from the power-saving mode when the input device detects the electronic board eraser being moved, a frequency of the sensing circuit sensing the beacon signal in the power-saving mode is slower than that of the sensing circuit sensing the beacon signal in the working mode.

In the embodiment, for increasing signal-to-noise ratio (SNR) of detection, the at least three eraser electrodes or the sensing electrode are/is elastic conductive material and a part of the wiping surface.

In the embodiment, for providing a wiping force, the at least three eraser electrodes include force sensors individually, the electrical signals correspond to each force sensors' pressure. In the embodiment, the electrical signals emitted from each of the eraser electrodes include two frequency sets of signals, the pressure corresponds to a relation of signal strength of the two frequency sets.

In the embodiment, for allowing the touch sensitive processing apparatus of the touch panel to detect directions of the electronic board eraser, the electronic board eraser includes three eraser electrodes, three distances among the three eraser electrodes are different.

In the embodiment, for facilitating users to use the corner or edge of the electronic board eraser to wipe smaller area, the shape of the case is a square body, the electronic board eraser includes four eraser electrodes respectively located in four corners of the wiping surface.

In the embodiment, for allowing the touch sensitive processing apparatus of the touch panel to detect the electronic board eraser or analyze status message(s) of the electronic board eraser, a modulation method for the electrical signals includes one of the following: emitting a same frequency set of electrical signals via the at least three eraser electrodes sequentially in time-sharing manner; emitting status messages via one of or multiple the eraser electrodes simultaneously; emitting different frequency sets of electrical signals via at least two of the eraser electrodes simultaneously; and emitting two different frequency sets of electrical signals via the at least three eraser electrodes sequentially in time-sharing manner.

In the embodiment, for performing wireless charging to the electronic board eraser, the electronic board eraser further includes: a battery used to supply electric power to the processor, the sensing electrode and the driving electrode; and a wireless charging module coupled to the battery used to receive a wireless signal emitted from the touch panel to charge the battery.

According to an embodiment of the present invention, it provides a controlling method for electronic board eraser. The controlling method includes: having a sensing circuit of an electronic board eraser sense a beacon signal emitted from a touch panel via a sensing electrode of the electronic board eraser; and having a driving circuit of the electronic board eraser provide electrical signals to at least three eraser electrodes of the electronic board eraser after a time period since the beacon signal is emitted.

In the embodiment, for easy cleaning, a case of the electronic board eraser and a wiping surface connecting to the case are constituted by waterproof material, and make the processor, the sensing circuit and the driving circuit be inside an inner space of the case and the wiping surface.

In the embodiment, for transmitting the state(s), it further includes: after a state of an input device of the electronic board eraser changes, the electrical signals also change correspondingly. In the embodiment, for detecting different inputs or states, the input device includes one of the following device types: button, touch button, roller, multi-stage switch, accelerometer, gyroscope, moving sensor and other devices.

In the embodiment, for saving power, it further includes: entering a power-saving mode from a working mode when the input device detects the electronic board eraser being in still for a period, retrieving the working mode from the power-saving mode when the input device detects the electronic board eraser being moved. A frequency of the sensing circuit sensing the beacon signal in the power-saving mode is slower than that of the sensing circuit sensing the beacon signal in the working mode.

In the embodiment, for increasing signal-to-noise ratio (SNR) of detection, the at least three eraser electrodes or the sensing electrode are/is elastic conductive material and a part of the wiping surface.

In the embodiment, for providing a wiping force, the at least three eraser electrodes include force sensors individually, the electrical signals correspond to each force sensors' pressure. In the embodiment, the electrical signals emitted from each of the eraser electrodes include two frequency sets of signals, the pressure corresponds to a relation of signal strength of the two frequency sets.

In the embodiment, for allowing the touch sensitive processing apparatus of the touch panel to detect directions of the electronic board eraser, the electronic board eraser includes three eraser electrodes, three distances among the three eraser electrodes are different.

In the embodiment, for facilitating users to use the corner or edge of the electronic board eraser to wipe smaller area, the shape of the case is a square body, the electronic board eraser includes four eraser electrodes respectively located in four corners of the wiping surface.

In the embodiment, for allowing the touch sensitive processing apparatus of the touch panel to detect the electronic board eraser or analyze status message(s) of the electronic board eraser, a modulation method for the electrical signals includes one of the following: emitting a same frequency set of electrical signals via the at least three eraser electrodes sequentially in time-sharing manner; emitting status messages via one of or multiple the eraser electrodes simultaneously; emitting different frequency sets of electrical signals via at least two of the eraser electrodes simultaneously; and emitting two different frequency sets of electrical signals via the at least three eraser electrodes sequentially in time-sharing manner.

In the embodiment, for performing wireless charging to the electronic board eraser, the electronic board eraser further includes: a battery used to supply electric power to the processor, the sensing electrode and the driving electrode; and a wireless charging module coupled to the battery. The controlling method further includes: using the wireless charging module to receive a wireless signal emitted from the touch panel to charge the battery.

According to an embodiment of the present invention, it provides a touch sensitive processing apparatus for detecting an electronic board eraser. The touch sensitive processing apparatus connects to a touch panel. The touch panel includes parallel first electrodes and parallel second electrodes, each of the first electrodes intersects with the second electrodes to form multiple intersection areas. The touch sensitive processing apparatus includes: a driving circuit connecting to the first electrodes; a sensing circuit connecting to the first electrodes and the second electrodes; and a processor connecting to the driving circuit and the sensing circuit. Wherein the processor is configured to execute a program module for realizing the following steps: having the driving circuit emit a beacon signal via the first electrodes simultaneously; and having the sensing circuit detect electrical signal emitted from at least three eraser electrodes of the electronic board eraser via the first and the second electrodes after a time period since the beacon signal is emitted.

In the embodiment, for knowing the status message(s) that the electronic board eraser wants to transmit, the program module further includes the following step: having the sensing circuit sense the electrical signal emitted from the electronic board eraser via at least one of the first electrodes and the second electrodes to determine a status message of the electronic board eraser.

In the embodiment, for matching the experience of using traditional eraser corners, the program module further includes the following steps: determining how many eraser electrodes emitting the electrical signal; when only one of the eraser electrodes emits the electrical signal, determining a pressure value corresponding to the eraser electrode and determining an erasing area according to a position and the pressure value of the eraser electrode; when multiple the eraser electrodes emit the electrical signal, determining multiple pressure values corresponding to respective positions of the eraser electrodes; and determining the erasing area according to more than one of positions of the eraser electrodes and more than one of the pressure values. In the embodiment, for determining directions of the electronic board eraser, the program module further includes the following step: when more than three of the eraser electrodes emit the electrical signal, determining the erasing area according to positions of these eraser electrodes.

In the embodiment, for matching the experience of using traditional eraser, when the pressure value gets bigger or a sum or an average of the pressure values gets bigger, the size of the erasing area becomes bigger. In the embodiment, the erasing area is not bigger than the wiping surface.

In the embodiment, for allowing the touch sensitive processing apparatus of the touch panel to detect the electronic board eraser or analyze status message(s) of the electronic board eraser, a modulation method for the electrical signal includes one of the following: receiving a same frequency set of electrical signals sequentially in time-sharing manner to determine whether one of the eraser electrodes emits electrical signal in each period; receiving an electrical signal containing a status message from at least one of the first electrodes and the second electrodes simultaneously; receiving different frequency sets of electrical signals emitted from different eraser electrodes simultaneously; and receiving two different frequency sets of electrical signals emitted from one of the at least three eraser electrodes sequentially in time-sharing manner.

According to an embodiment of the present invention, it provides a touch sensitive processing method for detecting an electronic board eraser. The touch sensitive processing method is applicable to a touch sensitive processing apparatus connecting to a touch panel. Wherein the touch panel includes parallel first electrodes and parallel second electrodes, each of the first electrodes intersects with the second electrodes to form multiple intersection areas. The touch sensitive processing method includes: having a driving circuit of the touch sensitive processing apparatus emit a beacon signal via the first electrodes simultaneously; and having a sensing circuit of the touch sensitive processing apparatus detect electrical signal emitted from at least three eraser electrodes of the electronic board eraser via the first and the second electrodes after a time period since the beacon signal is emitted.

In the embodiment, for knowing the status message(s) that the electronic board eraser wants to transmit, it further includes: having the sensing circuit sense the electrical signal emitted from the electronic board eraser via at least one of the first electrodes and the second electrodes to determine a status message of the electronic board eraser.

In the embodiment, for matching the experience of using traditional eraser corners, it further includes: determining how many eraser electrodes emitting the electrical signal; when only one of the eraser electrodes emits the electrical signal, determining a pressure value corresponding to the eraser electrode and determining an erasing area according to a position and the pressure value of the eraser electrode; when multiple the eraser electrodes emit the electrical signal, determining multiple pressure values corresponding to respective positions of the eraser electrodes; and determining the erasing area according to more than one of positions of the eraser electrodes and more than one of the pressure values. In the embodiment, for determining directions of the electronic board eraser, it further includes: when more than three of the eraser electrodes emit the electrical signal, determining the erasing area according to positions of these eraser electrodes.

In the embodiment, for matching the experience of using traditional eraser, when the pressure value gets bigger or a sum or an average of the pressure values gets bigger, the size of the erasing area becomes bigger. In the embodiment, the erasing area is not bigger than the wiping surface.

In the embodiment, for allowing the touch sensitive processing apparatus of the touch panel to detect the electronic board eraser or analyze status message(s) of the electronic board eraser, a modulation method for the electrical signal includes one of the following: receiving a same frequency set of electrical signals sequentially in time-sharing manner to determine whether one of the eraser electrodes emits electrical signal in each period; receiving an electrical signal containing a status message from at least one of the first electrodes and the second electrodes simultaneously; receiving different frequency sets of electrical signals emitted from different eraser electrodes simultaneously; and receiving two different frequency sets of electrical signals emitted from one of the at least three eraser electrodes sequentially in time-sharing manner.

According to an embodiment of the present invention, it provides a touch sensitive system for detecting an electronic board eraser. The touch sensitive system includes a touch panel and a touch sensitive processing apparatus connecting to the touch panel. The touch panel includes parallel first electrodes and parallel second electrodes, each of the first electrode intersects with the second electrodes to form multiple intersection areas. The touch sensitive processing apparatus includes: a driving circuit connecting to the first electrodes; a sensing circuit connecting to the first electrodes and the second electrodes; and a processor connecting to the driving circuit and the sensing circuit. Wherein the processor is configured to execute a program module for realizing the following steps: having the driving circuit emit a beacon signal via the first electrodes simultaneously; and having the sensing circuit detect electrical signal emitted from at least three eraser electrodes of the electronic board eraser via the first and the second electrodes after a time period since the beacon signal is emitted.

The electronic board eraser and touch sensitive system provided by the present invention may have the shape and size of a cuboid or an ellipsoid similar to the traditional eraser, allowing users to have experience like using traditional eraser. Especially, a larger area can be wiped when wiping forcefully. The corners and edges of the electronic board eraser can also be used to wipe smaller area. In addition, the electronic board eraser can be washed as well in order to wipe the pen marks on the traditional whiteboard as a traditional eraser.

BRIEF DESCRIPTION OF THE DRAWINGS

The present invention can be more fully understood by reading the following detailed description of the preferred embodiments, with reference made to the accompanying drawings, wherein.

DETAILED DESCRIPTION OF THE PREFERRED EMBODIMENTS

Figure 1:
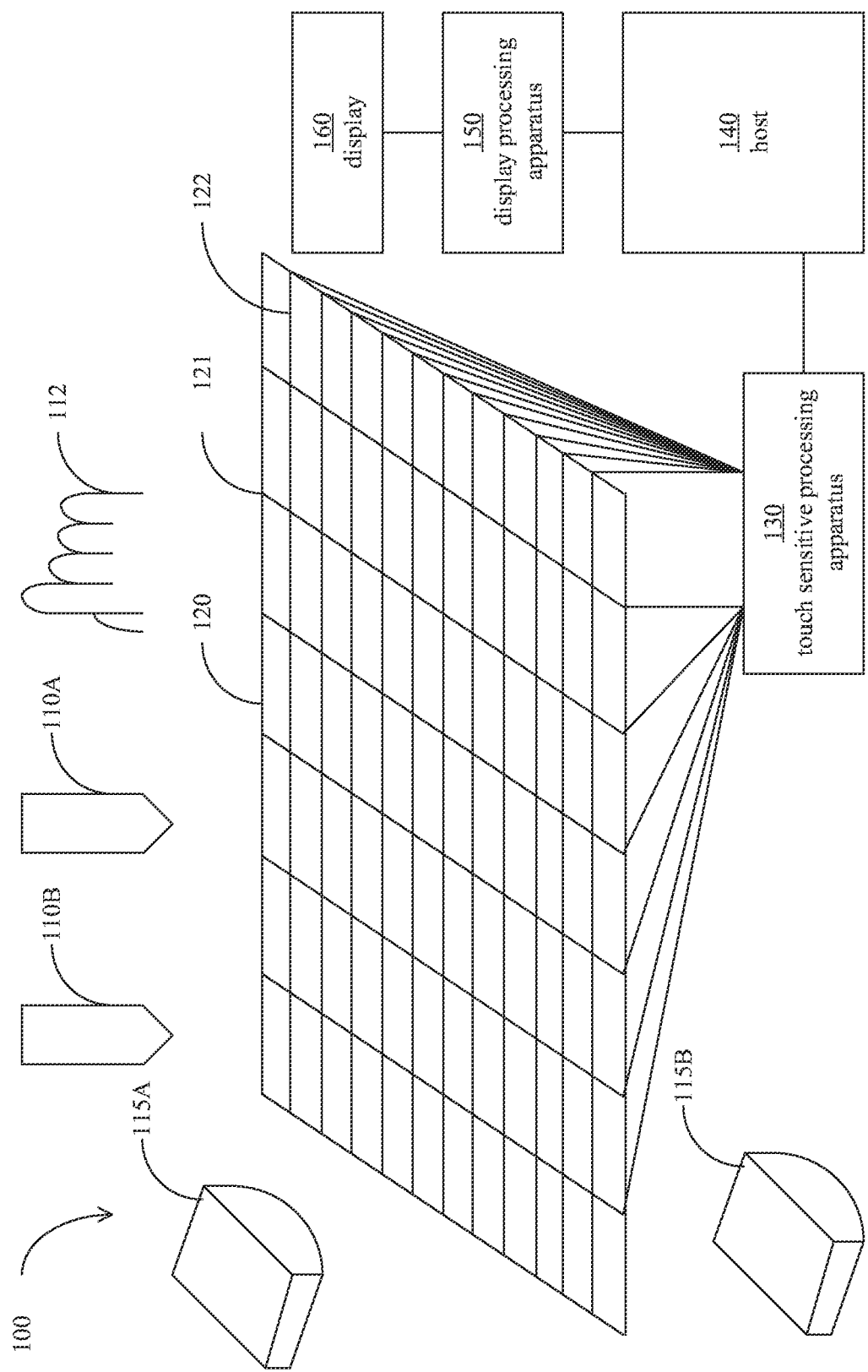
FIG. 1 shows a schematic diagram of an electronic system 100 according to an embodiment of the present invention.

Some embodiments of the present invention are described in detail below. However, in addition to the descriptions given below, the present invention can be applicable to other embodiments, and the scope of the present invention is not limited by such, rather by the scope of the claims. Moreover, for better understanding and clarity of the description, some components in the drawings may not necessary be drawn to scale, in which some may be exaggerated relative to others, and irrelevant parts are omitted.

If any terms in this application conflict with terms used in any application(s) from which this application claims priority, or terms incorporated by reference into this application or the application(s) from which this application claims priority, a construction based on the terms as used or defined in this application should be applied.

Referring to FIG. 1, it shows a schematic diagram of an electronic system 100 according to an embodiment of the present invention. The electronic system 100 includes a host 140 including a device that controls the overall operation of the electronic system 100, such as the central processing unit, the memory and the interface used to connect the peripheral input/output devices. The interface may include industrial standard interfaces, such as PCI, PCI-E, SATA, ATA, USB, UART, etc., or a proprietary interface. The host 140 connects to a display processing apparatus 150 via the interface, which is used to connect to a display 160 and to process the display contents of the display 160. The host 140 also connects to a touch sensitive processing apparatus 130 via the interface, which is used to connect a transparent touch panel 120 formed by multiple electrodes and to use the touch panel 120 with the multiple electrodes to detect approaching or touching object(s), such as external conductive object (such as hand 112), styluses 110A and 110B, electronic erasers (or electronic board erasers, thereinafter electronic board erasers) 115A and 115B, and so forth. The touch panel 120 includes multiple first electrodes 121 being parallel to a first axis and multiple second electrodes 122 being parallel to a second axis. The touch panel 120 may be set directly on or above the display 160, or the touch panel 120 can be integrated with the display 160 to become an embedded touch panel. The present invention does not limit the combination form of the touch panel 120 and the display 160.

Figure 2:
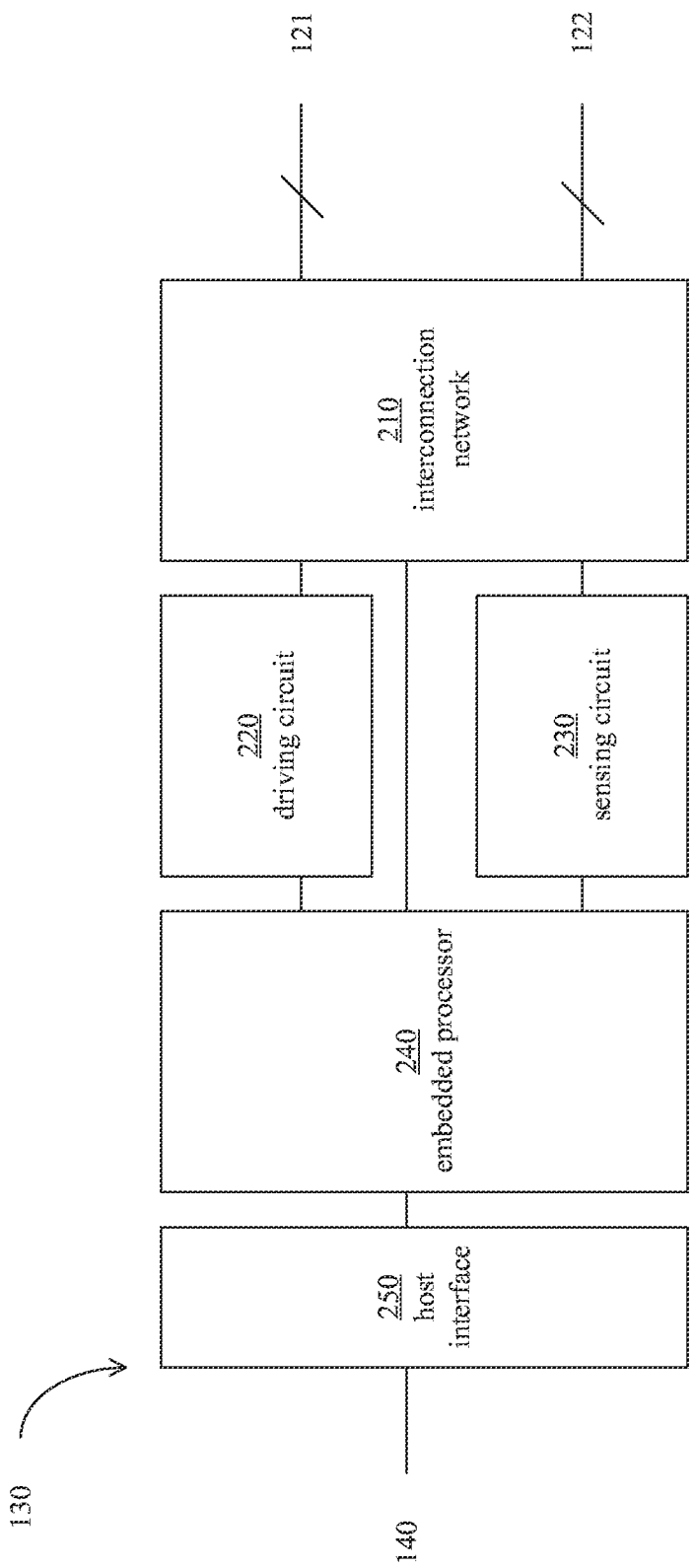
FIG. 2 shows a block diagram of a touch sensitive processing apparatus 130 according to an embodiment of the present invention.

Referring to FIG. 2, it shows a block diagram of a touch sensitive processing apparatus 130 according to an embodiment of the present invention. The touch sensitive processing apparatus 130 includes an embedded processor 240, which is used for connecting and controlling an interconnection network 210, a driving circuit 220, a sensing circuit 230, and a host interface 250. The driving circuit 220 may respectively connect each first electrode 121 and each second electrode 122 via the interconnection network 210 to use these electrodes to emit a driving signal. The sensing circuit 230 may respectively connect each first electrode 121 and each second electrode 122 via the interconnection network 210 to use these electrodes to sense signal(s). The embedded processor 240 can communicate with the host 140 through the host interface 250. The embedded processor 240 may perform a program module stored in non-volatile memory to detect the abovementioned approximate object (s) and event(s).

Figure 3A:
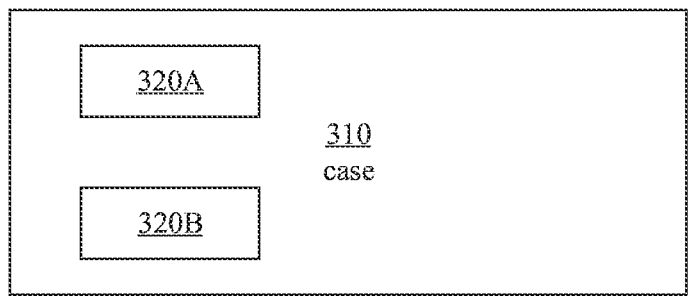
FIG. 3A shows a top view of an electronic board eraser 115 according to an embodiment of the present invention.

Referring to FIG. 3A, it shows a top view of an electronic board eraser 115 according to an embodiment of the present invention. The eraser 115 can be a cuboid including a housing (or case, thereinafter case) 310 for user's holding and includes a wired/wireless charging or replaceable power supply module and circuit. The top or side of the case 310 may include more than one input device 320, such as a first button 320A and a second button 320B. One of the buttons or switches can be used to startup and shutdown electronic parts inside the electronic board eraser 115. In addition to the traditional mechanical buttons, the input device 320 may be rollers, multi-stage switches, touch buttons, accelerometers, gyroscopes, moving sensors and other devices. The case 310 may also include an output device, such as a lamp, vibrator, and sounder, indicating the amount of electricity or the state of its use.

Figure 3B:
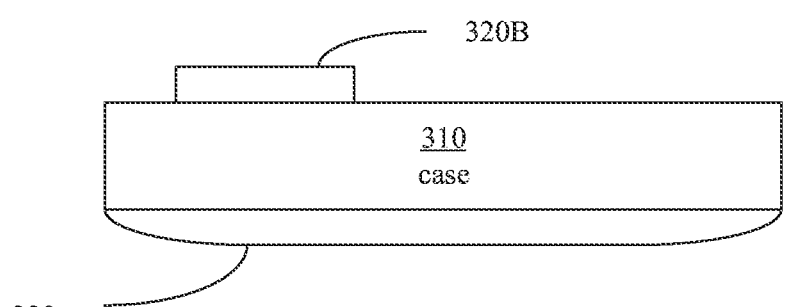
FIG. 3B shows a side view of an electronic board eraser 115 according to an embodiment of the present invention.

Referring to FIG. 3B, it shows a side view of an electronic board eraser 115 according to an embodiment of the present invention. The bottom of the case 310 includes an elastic erasing (or wiping, thereinafter wiping) surface 330. In addition to being used to touch the touch panel 120, the wiping surface 330 can be used to erase handwritings written on traditional whiteboard by marker. The case 310, the input device 320 and the wiping surface 330 may be constituted by waterproof material, their connection parts may also be waterproof, to facilitate the user to clean the electronic board eraser 115.

Figure 3C:
FIG. 3C shows a bottom view of an electronic board eraser 115 according to an embodiment of the present invention.

Referring to FIG. 3C, it shows a bottom view of an electronic board eraser 115 according to an embodiment of the present invention. In this embodiment, the wiping surface 330 includes a first eraser electrode 341, a second eraser electrode 342, and a third eraser electrode 343. They are respectively in three corners of the wiping surface 330. The wiping surfaces of these three corners may be elastic conductive material, used as eraser electrodes.

Figure 3D:
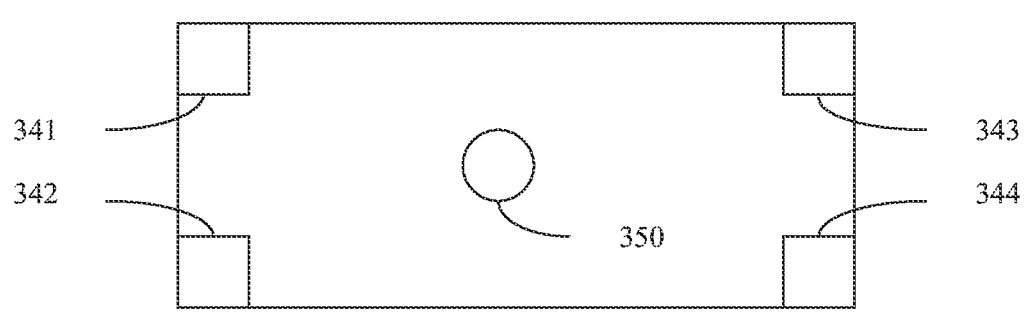
FIG. 3D shows a bottom view of an electronic board eraser 115 according to an embodiment of the present invention.

Referring to FIG. 3D, it shows a bottom view of an electronic board eraser 115 according to an embodiment of the present invention. In this embodiment, the wiping surface 330 includes a first eraser electrode 341, a second eraser electrode 342, a third eraser electrode 343, and a fourth electrode 344. They are respectively in four corners of the wiping surface 330. The wiping surfaces of these four corners may be elastic conductive material, used as eraser electrodes.

In one embodiment, these eraser electrodes 341-344 may include force sensors or a part of force sensors. These force sensors, such as force sensing resistors, force sensing capacitors, and other passive components, sense the pressure. Or, these force sensors sense the pressure by active components.

The passive force sensor can refer to the applicant's U.S. patent application, US2015/0153845, and its priority document. This application used a stylus as an example, but it can be applicable to the electronic board eraser 115 of the present invention. For example, FIGS. 2-5 of the application, which use at least two signal sources with different frequencies to respectively output a signal with a first frequency and a signal with a second frequency to a first component with variable impedance and a second component with fixed impedance. The first component is subject to the pressure of the stylus tip (such as the eraser electrodes 341-344 in the present invention) to change its impedance, and the tip or the eraser electrodes 341-344 emits/emit electrical signal(s) to the touch panel 120. A relationship between the amplitude of the first frequency signal in the electrical signal and the amplitude of the second frequency signal in the electrical signal can represent the pressure received by the tip or the eraser electrodes 341-344.

FIGS. 7A-7D of the application, are the use of a single frequency signal source, which respectively outputs a signal with a first frequency signal and a signal with a second frequency signal to a first component with variable impedance and a second component with fixed impedance. The first component is subject to the pressure of the stylus tip (such as the eraser electrodes 341-344 in the present invention) to change its impedance. The electronic board eraser 115 can calculate the current values of the outputs of the first component and the second component respectively, which indicates the pressure value(s) received by the tip or eraser electrodes 341-344.

As for the active force sensor, it can refer to the example of Republic of China (Taiwan) patent publication No. 201339904. This case also takes the stylus as an example, but it can be applicable to the electronic board eraser 115 of the present invention. It only needs to change the stylus tip and the signal transmitter to the eraser electrodes 341-344.

Compared with the shape of the eraser electrode in FIG. 3C, the shape of the eraser electrode in FIG. 3D is different. The present invention does not limit the shape of the eraser electrodes 341-344. In FIG. 3D, the electronic board eraser 115 further includes a sensing electrode 350. The sensing electrode 350 may locate on the surface of the wiping surface 330. Although the sensing electrode 350 shown in FIG. 3D is positioned in the middle of the wiping surface 330, the present invention does not limit the position of the sensing electrode 350. The sensing electrode 350 can be used to receive a beacon signal from the touch panel 120. When the beacon signal is strong, the sensing electrode 350 does not need to be located on the surface of the wiping surface 330, it can be set in the case 310 and can sense the beacon signal.

Figure 3E:
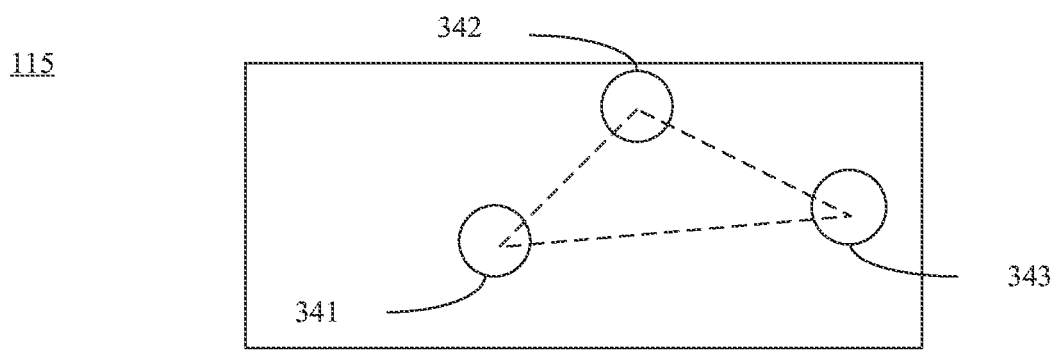
FIG. 3E shows a bottom view of an electronic board eraser 115 according to an embodiment of the present invention.

Referring to FIG. 3E, it shows a bottom view of an electronic board eraser 115 according to an embodiment of the present invention. In this embodiment, the wiping surface 330 includes a first eraser electrode 341, a second eraser electrode 342, and a third eraser electrode 343. These three eraser electrodes 341-343 are not in the corners of the wiping surface 330 but form a triangle on the wiping surface 330. In order to identify the direction of the electron board eraser 115, each side of the triangle formed by the three eraser electrodes 341-343 is unequal length. Accordingly, the touch sensitive processing apparatus 130 can detect the positions of the eraser electrodes 341-343 and calculate the area that the wiping surface 330 of the electronic board eraser 115 projects onto the surface of the touch panel 120.

Figure 3F:
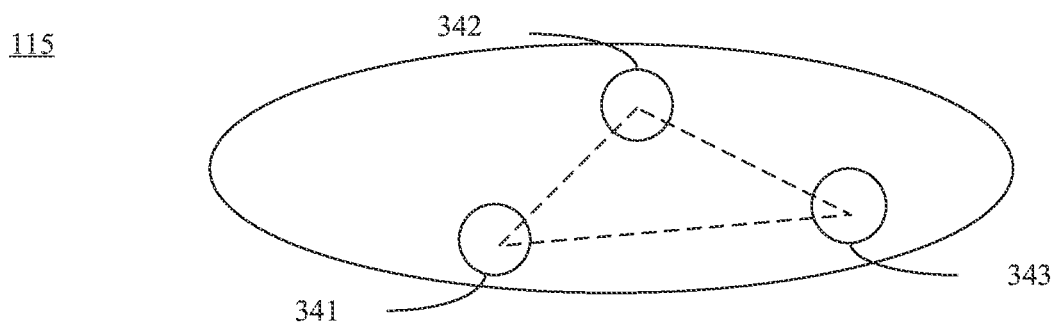
FIG. 3F shows a bottom view of an electronic board eraser 115 according to an embodiment of the present invention.

Referring to FIG. 3F, it shows a bottom view of an electronic board eraser 115 according to an embodiment of the present invention. In this embodiment, the wiping surface 330 is an ellipse. In other words, the electronic board eraser 115 can be an elliptical cube to facilitate user grip. The present invention does not limit the shape of the electronic board eraser 115 and its wiping surface 330 if it is convenient to use.

Figure 4:
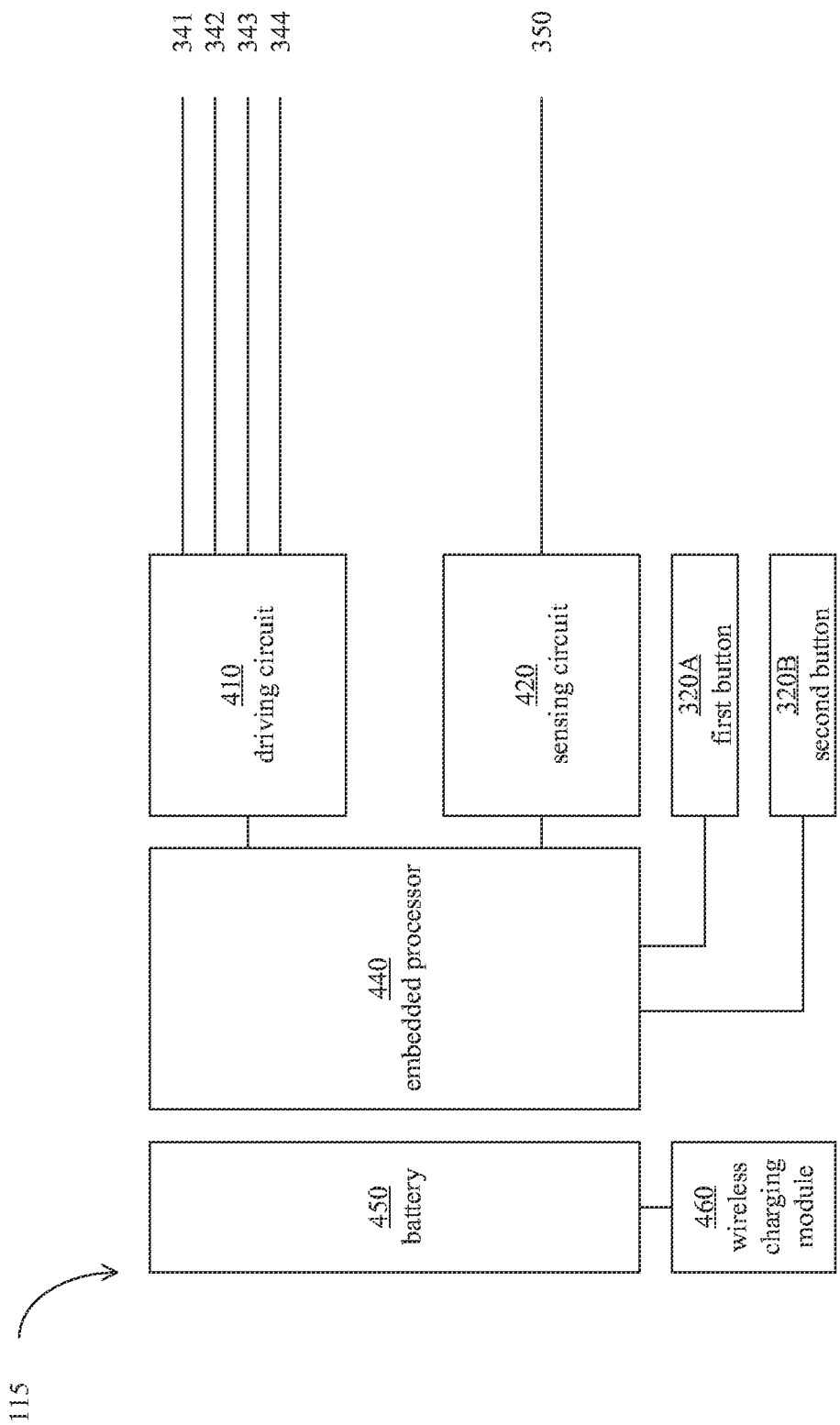
FIG. 4 shows a block diagram of an electronic board eraser according to an embodiment of the present invention.

Referring to FIG. 4, it shows a block diagram of an electronic board eraser according to an embodiment of the present invention. The electronic board eraser 115 may include a driving circuit 410, a sensing circuit 420, an embedded processor 440, a battery 450, and a wireless charging module 460 coupled to the battery 450. The battery 450 is used to supply electric power to internal electronic components of the electronic board eraser 115. The driving circuit 410 connects to the eraser electrodes 341-344 respectively to emit electrical signals to the touch panel 120. The sensing circuit 420 connects to the sensing electrode 350 to detect beacon signals. The embedded processor 440 connects to the driving circuit 410, the sensing circuit 420 and the abovementioned input device(s) and the output device (s), such as the first button 320A and the second button 320B. The embedded processor 440 can perform a program module stored in non-volatile memory to enable the touch sensitive processing apparatus 130 to detect the action of the electronic board eraser 115. The wireless charging module 460 can be used to receive wireless charging signal to charge the battery 450. The wireless charging signal may come from the touch panel 120 or particular wireless charging module.

Figure 5A:
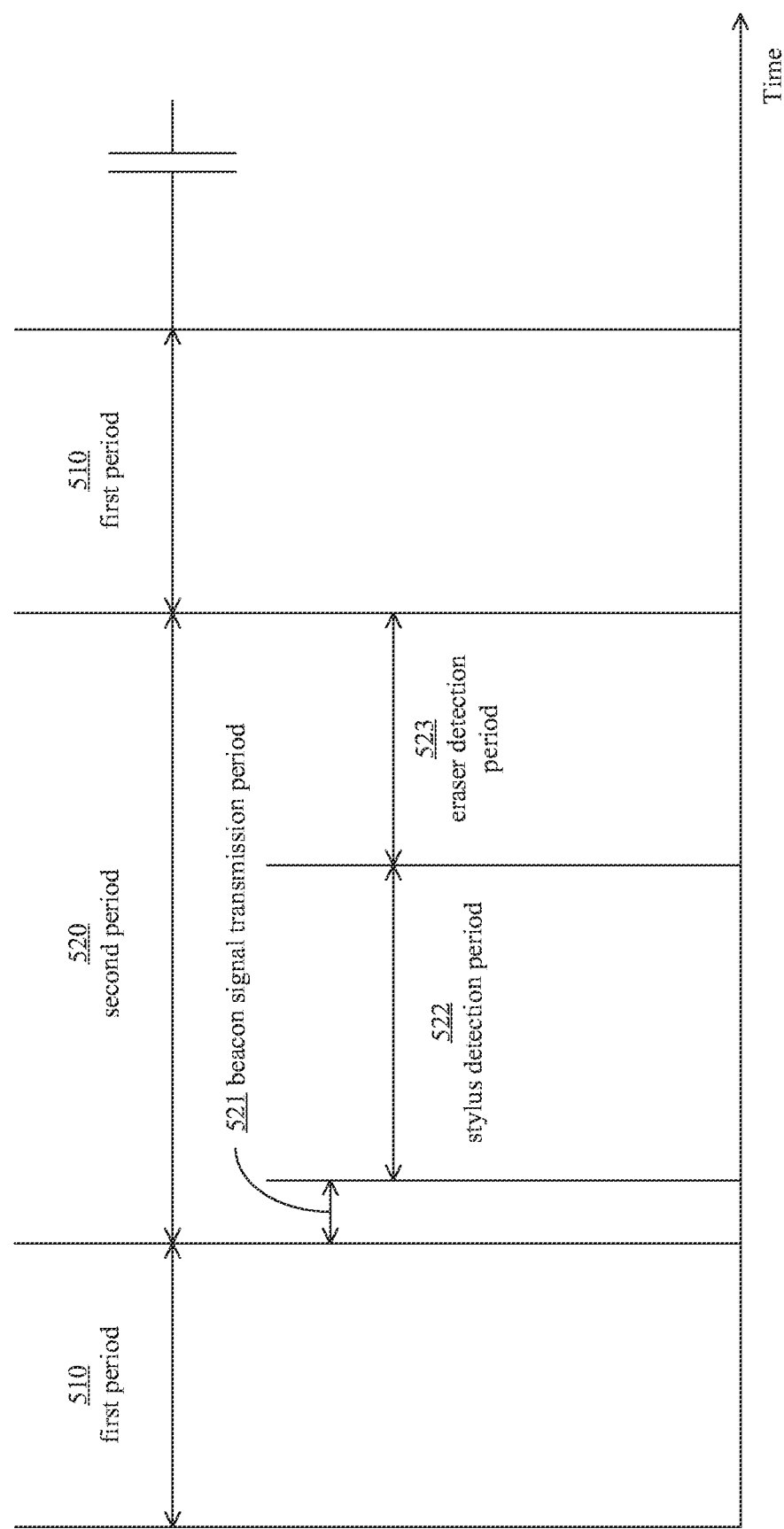
FIG. 5A shows an operation timing diagram of an electronic system 100 according to an embodiment of the present invention.

Referring to FIG. 5A, it shows an operation timing diagram of an electronic system 100 according to an embodiment of the present invention. In FIG. 5A, it includes a first period 510 for external object detection and a second period 520 for the stylus and eraser detection. The present invention does not limit the ratio of the first period 510 to the second period 520 to 1:1, nor the first period 510 and the second period 520 having to be interlacing. When the touch sensitive processing apparatus 130 judges only external object approximates the touch panel 120, the proportion of the second period 520 can be reduced. When the touch sensitive processing apparatus 130 judges only the stylus and the eraser approximate the touch panel 120, the proportion of the first period of 510 can be reduced. In the second period 520, it includes a beacon signal transmission period 521, a stylus detection period 522, and an eraser detection period 523. In the present invention, the sequence of the stylus detection period 522 and the eraser detection period 523 is not limited, but the stylus detection period 522 and the eraser detection period 523 shall be after the beacon signal transmission period 521.

Figure 5B:
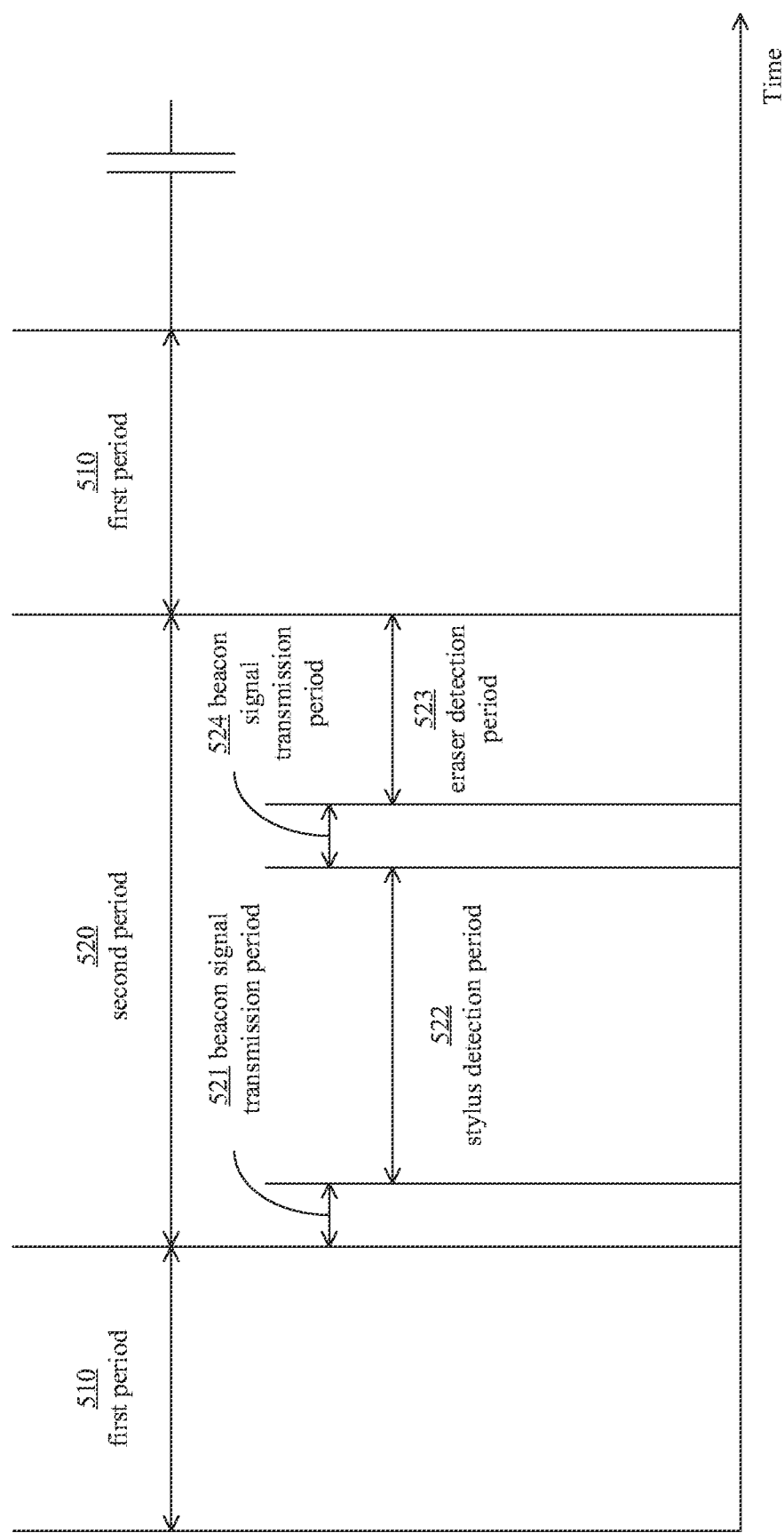
FIG. 5B shows a variation of the embodiment shown in FIG. 5A.

Referring to FIG. 5B, it shows a variation of the embodiment shown in FIG. 5A. In FIG. 5B, the second period 520 contains another beacon signal transmission period 524. After the period 521 in which the beacon signal is emitted, the stylus 110 and the touch sensitive processing apparatus 130 perform procedure for detecting the stylus 110 during the period 522. After the period 524 in which another beacon signal is emitted, the electronic board eraser 115 and the touch sensitive processing apparatus 130 perform procedure for detecting the eraser during the period 523. The stylus detection period 522 and the eraser detection period 523 do not need to be immediately following the period 521 and the period 524 respectively, blank (turnaround) periods for the stylus 110 and the eraser 115 to perform receiving processing and preparation may be respectively included between them.

Figure 5C:
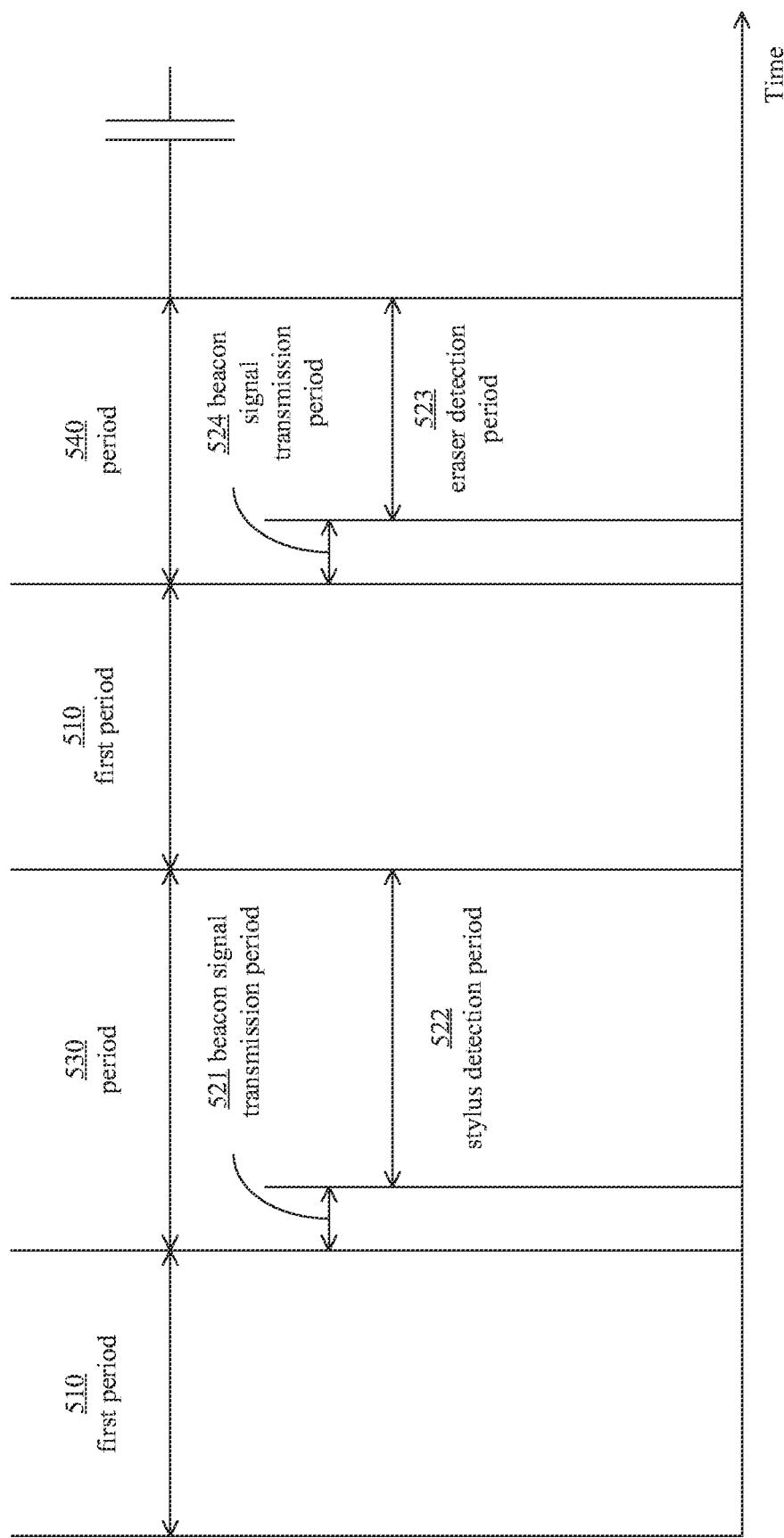
FIG. 5C shows a variation of the embodiments of FIGS. 5A and 5B.

Referring to FIG. 5C, it shows a variation of the embodiments of FIGS. 5A and 5B. In FIG. 5C, the stylus and the eraser are detected in the discontinuous period 530 and 540 respectively. This is owing to the use of habits, when the stylus is in use, the eraser is usually idle; when the eraser is in use, the stylus is usually absent. Consequently, when the touch sensitive processing apparatus 130 determines that only the stylus approximates the touch panel, the proportion of the periods 510 and 540 can be reduced. When the touch sensitive processing apparatus 130 determines that only the eraser approximates the touch panel, the proportion of the periods 510 and 530 can be reduced.

Referring to FIGS. 6A-6G, they show operation timing diagrams of the stylus and eraser detection period 520 according to embodiments of the invention. They can be applicable to the eraser 115 in the embodiments of FIGS. 3A-F and FIG. 4. Although these embodiments are based on the stylus and eraser detection period 520 in FIG. 5A, a person having ordinary skill in the art can appreciate that if the stylus detection period 522 is omitted and the beacon signal transmission period 521 is changed to the beacon signal transmission time 524, it can be applicable to the embodiments of FIGS. 5B and 5C.

Figure 6A:
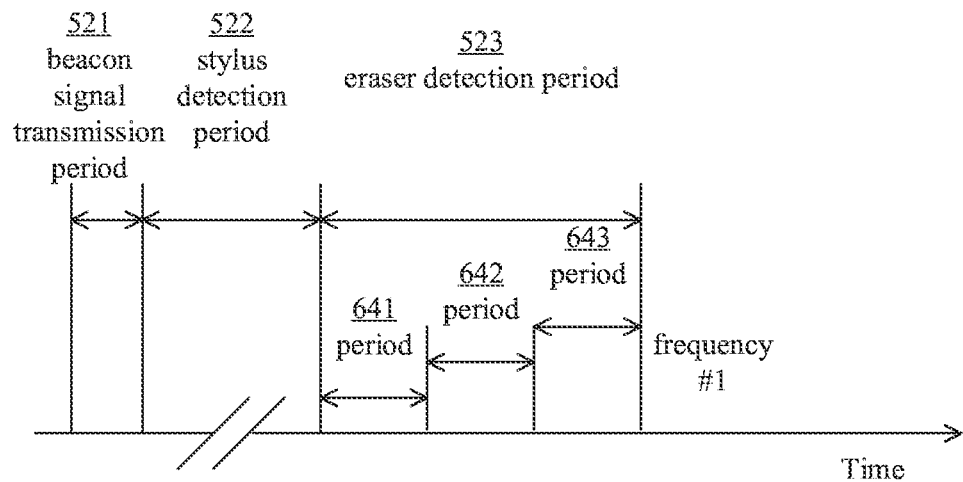
FIGS. 6A-G show operation timing diagrams of the stylus and eraser detection period 520 according to embodiments of the invention.

In the embodiment of FIG. 6A, in the period 521, the sensing circuit 420 can detect beacon signals emitted by the touch panel 120 through the sensing electrode 350. Then, in the embodiments of FIGS. 3C, 3E, and 3F, the embedded processor 440 allows the driving circuit 410 to transmit the same first frequency signal to the touch panel 120 through the three eraser electrodes 341-343 at three periods 641-643, respectively. After the beacon signal is issued, the touch sensitive processing apparatus 130 can detect the electrical signal through each of the electrodes 121 and 122 on the touch panel 120 to find out the positions of the three eraser electrodes 341-343 corresponding to the touch panel 120.

Figure 6B:
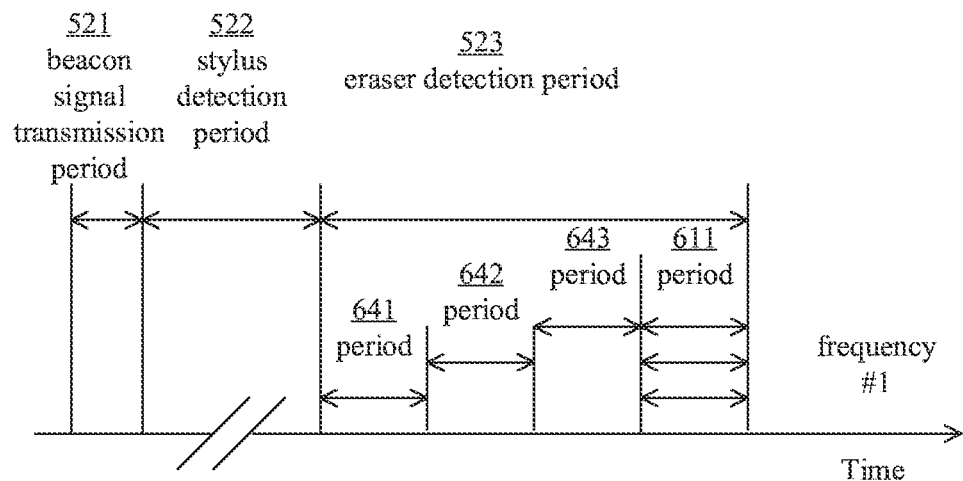

Referring to FIG. 6B, it shows a variation of the embodiment of FIG. 6A. It can be applicable to the embodiments of FIGS. 3C, 3E, and 3F as well. The embedded processor 440 can enable the driving circuit 410 to transmit the status messages of the input device 310 and/or the battery 450 via at least one eraser electrode in a period 611 after the three periods 641-643. For example, the same use of the first frequency to transmit the message, but the present invention does not limit the use of the same signal modulation method to transmit the message. In one variation, the driving circuit 410 in the period 611 simultaneously transmits the message via the three eraser electrodes 341-343.

Figure 6C:
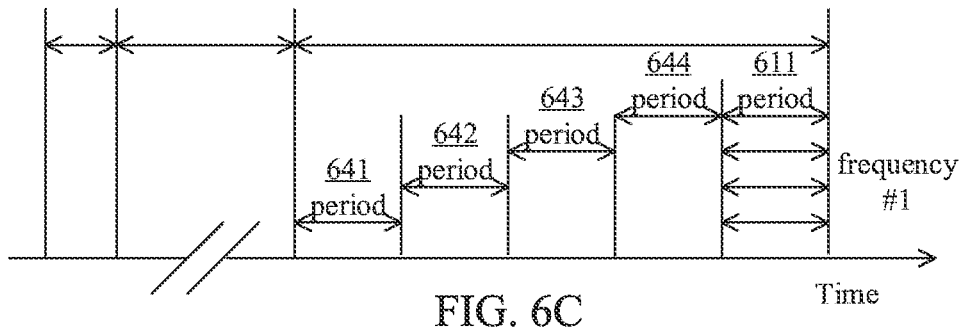

Referring to FIG. 6C, it shows a variation of the embodiment of FIG. 6B. It is applicable to the embodiment of FIG. 3D. The difference from the embodiment of FIG. 6B is that the embedded processor 440 uses four periods 641-644, respectively, to enable the driving circuit 410 to emit a signal with the same first frequency via the eraser electrodes 341-344. Since the user does not necessarily make the wiping surface 330 of the eraser 115 fully touch on the touch panel 120 for use, and the user may touch the touch panel 120 with only one corner or side of the eraser 115, making only one or two of the four eraser electrodes 341-344 approximate the touch panel 120, the touch sensitive processing apparatus 130 may not receive electrical signals from two or three eraser electrodes. Therefore, during the period 611, the driving circuit 410 transmits the message through the four eraser electrodes 341-344 at the same time to ensure that at least one eraser electrode sends the message to be received.

Figure 6D:
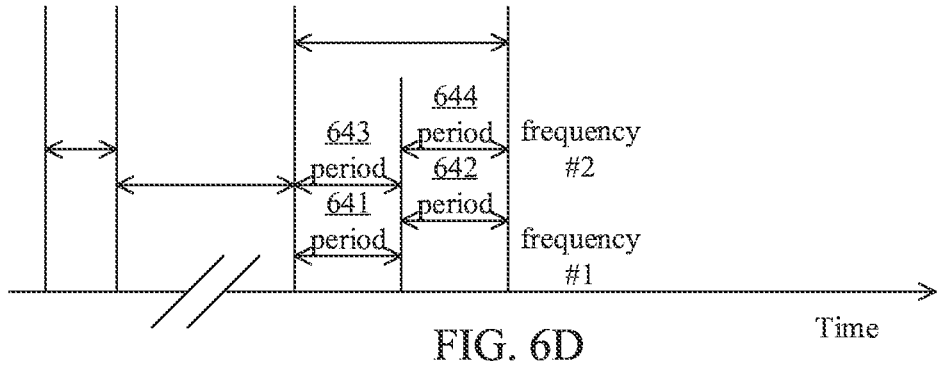

Referring to FIG. 6D, it utilizes signals with two frequencies to shorten the length of the eraser detection period 523. The driving circuit 410 can simultaneously output signals with two frequencies to two eraser electrodes, such as outputting a first frequency signal to the first eraser electrode 341, while outputting a second frequency signal to the third eraser electrode 343. In other words, the first eraser electrode transmission period 641 and the third eraser electrode transmission time 643 can be folded together. Then, it outputs the first frequency signal to the second eraser electrode 342, simultaneously outputting the second frequency signal to the fourth eraser electrode 344. In other words, the second eraser electrode transmission period 642 and the fourth eraser electrode transmission time 644 can be folded together. The present invention does not limit which two eraser electrodes are output simultaneously. The two frequencies may be independent of each other's resonant frequencies. After that period, the message transmission period 611 can also be appended to.

Figure 6E:
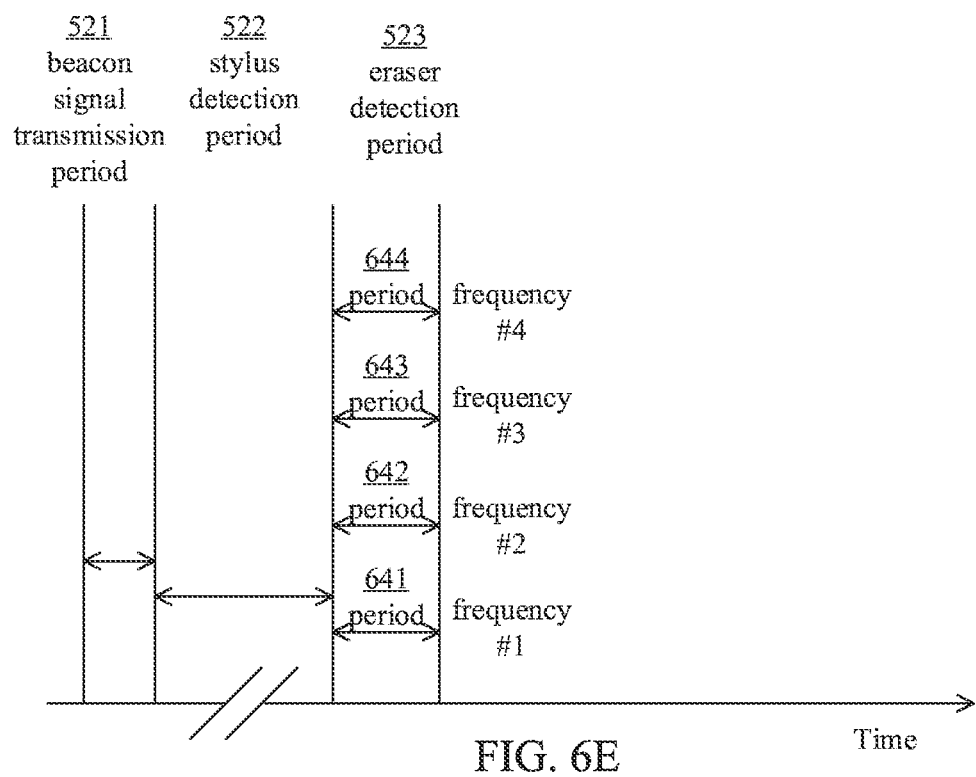

Referring to FIG. 6E, it utilizes signals with four frequencies to shorten the length of the eraser detection period of 523. The driving circuit 410 can simultaneously output signals with four frequencies to the four eraser electrodes 341-344, making each eraser electrode transmission periods 641-643 overlap simultaneously. The four frequencies can be independent of the resonant frequencies of other frequencies. After that, the message transmission period 611 can also be appended to. When this case applies to the embodiments of FIGS. 3C, 3E, and 3F, four frequencies can be reduced to three frequencies.

Figure 6F:
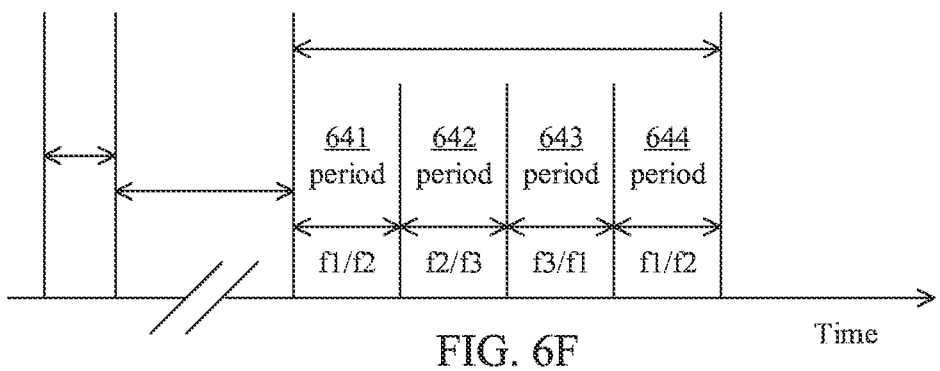

Referring to FIG. 6F, in addition to emitting the electrical signals that allow the touch sensitive processing apparatus 130 to detect positions, each of the eraser electrodes 341-344 may emit an electrical signal representing received pressure. As previously mentioned, the relevant embodiments of FIGS. 2-5 of US2015/0153845, or the changes in the technical solutions shown in the example of No. 201339904 may be used. At each of the eraser electrode transmission periods 641-644, each of the eraser electrodes 341-344 in time-sharing manner emits an electrical signal including two frequencies, which indicates the pressure value received by the respective eraser electrode.

Figure 6G:
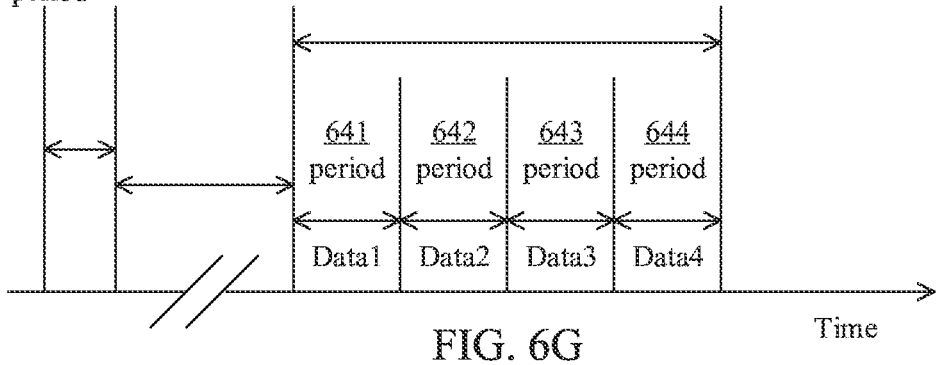

Referring to FIG. 6G, the same as those shown in FIG. 6F, each of the eraser electrodes 341-344 emits an electrical signal representing the pressure received by itself. As previously mentioned, the variations of the technical solutions shown in the relevant embodiments of FIGS. 7A-7B of US2015/0153845 can be used. During each of the eraser electrode transmission periods 641-644, each of the eraser electrodes 341-344 in time-sharing manner emits a modulated electrical signal, which indicates the pressure value received by the respective eraser electrode.

Figure 7:
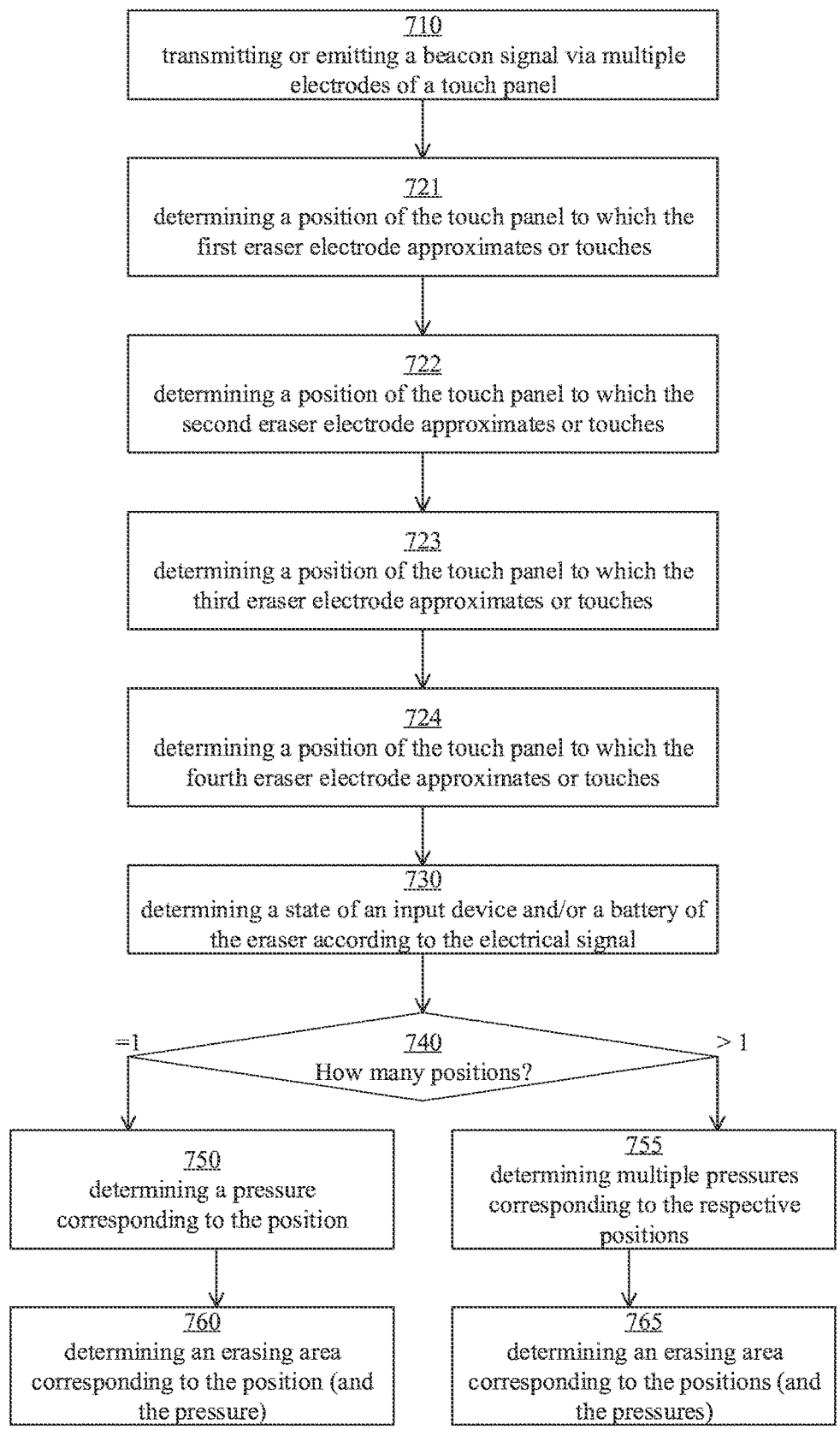
FIG. 7 shows a schematic flowchart of an electronic board eraser detection method according to an embodiment of the present invention.

Referring to FIG. 7, it shows a schematic flowchart of an eraser detection method according to an embodiment of the present invention. These steps can be applicable to the touch sensitive processing apparatus 130 shown in FIG. 2.

In step 710: transmitting or emitting a beacon signal via multiple electrodes of a touch panel 120. The beacon signal may be the beacon signal emitted in the period 521 or 524. The driving circuit 220 may be enabled to transmit the beacon signal via all the first electrodes 121 or via all the second electrodes 122. Or, the driving circuit 220 may be enabled to transmit the beacon signal via all the first electrodes 121 and all the second electrodes 122.

In step 721: waiting for a predetermined period after step 710, detecting electrical signal transmitted from a first eraser electrode 341 of an eraser 115 via the multiple electrodes 121 and 122 of the touch panel 120 and determining a position of the touch panel 120 to which the first eraser electrode 341 approximates or touches.

In step 722: waiting for a predetermined period after step 710, detecting electrical signal transmitted from a second eraser electrode 342 of the eraser 115 via the multiple electrodes 121 and 122 of the touch panel 120 and determining a position of the touch panel 120 to which the second eraser electrode 342 approximates or touches.

In step 723: waiting for a predetermined period after step 710, detecting electrical signal transmitted from a third eraser electrode 343 of the eraser 115 via the multiple electrodes 121 and 122 of the touch panel 120 and determining a position of the touch panel 120 to which the third eraser electrode 343 approximates or touches.

In optional step 724: waiting for a predetermined period after step 710, detecting electrical signal transmitted from a fourth eraser electrode 344 of the eraser 115 via the multiple electrodes 121 and 122 of the touch panel 120 and determining a position of the touch panel 120 to which the fourth eraser electrode 344 approximates or touches.

The abovementioned steps 721-724 may be performed in time division manner as those shown in FIGS. 6A-6C and 6F-6G or in the same time period as those shown in FIGS. 6D-6E.

In optional step 730: waiting for a predetermined period after step 710, detecting electrical signal(s) transmitted from at least one of the eraser electrodes 341-344 via the multiple electrodes 121 and 122 of the touch panel 120 and determining (a state)/states of an input device and/or a battery of the eraser 115 according to the electrical signal(s).

In step 740: determining how many position(s) there is(are) corresponding to those eraser electrode(s). If there is only one position, it means that the user uses only one corner of the eraser 115 to erase the handwriting, then the process goes to step 750/760. If there are two positions, it means that the user uses one side of the eraser 115 to erase the handwriting, then the process goes to step 755/765.

In optional step 750: determining a pressure corresponding to the position. The pressure received by the eraser electrode can be obtained by demodulating the electrical signal. The pressure can also be determined according to the area size of the position.

In optional step 755: determining multiple pressures corresponding to the respective positions. The pressures respectively received by the multiple eraser electrodes can be obtained by demodulating the electrical signals. The corresponding pressures can also be determined separately according to a sum of the area sizes of the positions.

In step 760: determining an erasing area corresponding to the position (and the pressure). If the pressure can be calculated, size of the erasing area can be determined according to the pressure. For example, the pressure gets bigger, the size of the erasing area becomes bigger. The pressure and the area size may be proportional, or they have a non-linear relationship.

In step 765: determining an erasing area corresponding to the positions (and the pressures). If a sum or an average of the pressures can be calculated, size of the erasing area can be determined according to the pressures. For example, the sum or average of the pressures gets bigger, the size of the erasing area becomes bigger. The sum or average of the pressures and the area size may be proportional, or they have a non-linear relationship.

In another embodiment, the pressure and an erasing probability in the erasing area may be proportional or have a non-linear relationship. The so-called erasing probability herein refers to a chance of each pixel in the erasing area is erased. For example, when the erasing probability is 80%, the 80% pixels in the erasing area will be erased and remaining 20% pixels unchanged.

In further another embodiment, the pressure and an erasing change probability in the erasing area may be proportional or have a non-linear relationship. The so-called erasing change probability herein refers to the change rate of each pixel in the erasing area. For example, the red, green, and blue, three-color values, of the pixel are represented as R, G, and B, respectively. When the erasing change probability is 80%, the change rate of the pixel in a certain period is 0.2R, 0.2G, 0.2B. The above changes can simulate the erasing effect of the traditional eraser to the traditional whiteboard.

In certain embodiments of applications, erasers can be used as brushes. The input device 310 on the eraser 115 may be used to switch the eraser's usage modes. When the touch sensitive processing apparatus 130 in step 730 receives the state change of the input device 310, it needs to inform the operating system and application(s) executed by the host 140 to change the input mode of the eraser.

In one embodiment, the embedded processor 440 of the eraser 115 can go into power-saving mode. For example, after the eraser 115 is placed below the touch panel 120 in still for a period and the beacon signal can be received, but if the processor 440 does not receive a start signal from the accelerometer, gyroscope, and moving sensor, the eraser electrode will not emit the electrical signal to conserve electric power.

In another embodiment, the eraser 115 is usually placed near the touch panel 120. Therefore, the eraser 115 may further include a wireless charging module, charging the battery 450 using the beacon signal or charging signal emitted by the touch panel 120.

Figure 8:
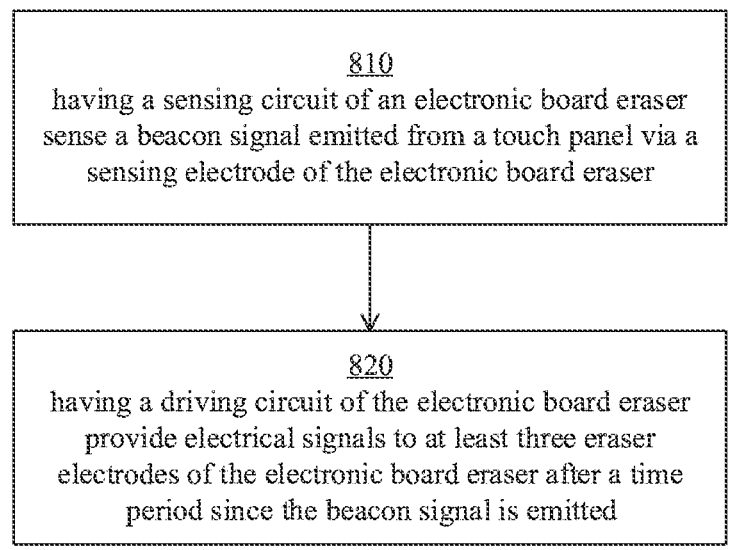
FIG. 8 shows a controlling method for an electronic board eraser according to an embodiment of the present invention.

Referring to FIG. 8, it shows a controlling method for an electronic board eraser according to an embodiment of the present invention. The controlling method is applicable to the electronic board eraser 115 and the processor 440 shown in FIG. 4.

In step 810: having a sensing circuit of an electronic board eraser sense a beacon signal emitted from a touch panel via a sensing electrode of the electronic board eraser.

In step 820: having a driving circuit of the electronic board eraser provide electrical signals to at least three eraser electrodes of the electronic board eraser after a time period since the beacon signal is emitted. The electrical signals' modulation method includes one of the following: emitting a same frequency set of electrical signals via the at least three eraser electrodes sequentially in time-sharing manner; emitting status messages via one of or multiple the eraser electrodes simultaneously; emitting different frequency sets of electrical signals via at least two of the eraser electrodes simultaneously; and emitting two different frequency sets of electrical signals via the at least three eraser electrodes sequentially in time-sharing manner.

The above embodiments are only used to illustrate the principles of the present invention, and they should not be construed as to limit the present invention in any way. The above embodiments can be modified by those with ordinary skill in the art without departing from the scope of the present invention as defined in the following appended claims.

What is claimed is:

1. A touch sensitive processing apparatus for detecting an electronic board eraser, wherein the touch sensitive processing apparatus connects to a touch panel, wherein the touch panel includes parallel first electrodes and parallel second electrodes, each of the first electrodes intersects with the second electrodes to form multiple intersection areas, the touch sensitive processing apparatus comprising:
   a driving circuit connecting to the first electrodes;
   a sensing circuit connecting to the first electrodes and the second electrodes; and
   a processor connecting to the driving circuit and the sensing circuit, wherein the processor is configured to execute a program module for realizing the following steps:
      having the driving circuit emit a beacon signal via the first electrodes simultaneously;
      having the sensing circuit detect electrical signal emitted from at least three eraser electrodes of the electronic board eraser via the first and the second electrodes after a time period since the beacon signal is emitted;
      detecting positions of the at least three eraser electrodes when the electrical signals emitted from the at least three eraser electrodes of the electronic board eraser are detected, wherein at least three distances among the at least three eraser electrodes are different; and
      calculating an erasing area of a surface of the touch panel being projected onto by a curvy and elastic wiping surface of the electronic board eraser according to the positions of the at least three eraser electrodes.

2. The touch sensitive processing apparatus as claimed in claim 1, wherein the program module further includes the following step:
having the sensing circuit sense the electrical signal emitted from the electronic board eraser via at least one of the first electrodes and the second electrodes to determine a status message of the electronic board eraser.

3. The touch sensitive processing apparatus as claimed in claim 1, wherein the program module further includes the following step:
when only one of the eraser electrodes emits the electrical signals, determining a pressure value corresponding to the eraser electrode and determining the erasing area according to a position and the pressure value of the eraser electrode.

4. The touch sensitive processing apparatus as claimed in claim 1, wherein the program module further includes the following step:
when more than three of the eraser electrodes emit the electrical signals, determining pressure values corresponding to these eraser electrodes; and determining the erasing area according to positions of these eraser electrodes and the pressure values of the eraser electrodes.

5. The touch sensitive processing apparatus as claimed in claim 4, wherein when an average of the pressure values gets bigger, the size of the erasing area becomes bigger.

6. The touch sensitive processing apparatus as claimed in claim 1, wherein a modulation method for the electrical signal includes one of the following:
receiving a same frequency set of electrical signals sequentially in time-sharing manner to determine whether one of the eraser electrodes emits electrical signal in each period;
receiving an electrical signal containing a status message from at least one of the first electrodes and the second electrodes simultaneously;
receiving different frequency sets of electrical signals emitted from different eraser electrodes simultaneously; and
receiving two different frequency sets of electrical signals emitted from one of the at least three eraser electrodes sequentially in time-sharing manner.

7. A touch sensitive processing method for detecting an electronic board eraser, wherein the touch sensitive processing method is applicable to a touch sensitive processing apparatus connecting to a touch panel, wherein the touch panel includes parallel first electrodes and parallel second electrodes, each of the first electrodes intersects with the second electrodes to form multiple intersection areas, the touch sensitive processing method comprising:
having a driving circuit of the touch sensitive processing apparatus emit a beacon signal via the first electrodes simultaneously;
having a sensing circuit of the touch sensitive processing apparatus detect electrical signal emitted from at least three eraser electrodes of the electronic board eraser via the first and the second electrodes after a time period since the beacon signal is emitted;
detecting positions of the at least three eraser electrodes when the electrical signals emitted from the at least three eraser electrodes of the electronic board eraser are detected, wherein at least three distances among the at least three eraser electrodes are different; and
calculating an erasing area of a surface of the touch panel being projected onto by a curvy and elastic wiping surface of the electronic board eraser according to the positions of the at least three eraser electrodes.

8. The touch sensitive processing method as claimed as claim 7, further comprises:
having the sensing circuit sense the electrical signal emitted from the electronic board eraser via at least one of the first electrodes and the second electrodes to determine a status message of the electronic board eraser.

9. The touch sensitive processing method as claimed as claim 7, further comprises:
when only one of the eraser electrodes emits the electrical signals, determining a pressure value corresponding to the eraser electrode and determining the erasing area according to a position and the pressure value of the eraser electrode.

10. The touch sensitive processing method as claimed as claim 7, further comprises:
when more than three of the eraser electrodes emit the electrical signals, determining pressure values corresponding to these eraser electrodes; and determining the erasing area according to positions of these eraser electrodes and the pressure values of the eraser electrodes.

11. The touch sensitive processing method as claimed as claim 10, further comprises:
when an average of the pressure values gets bigger, the size of the erasing area becomes bigger.

12. The touch sensitive processing method as claimed as claim 9, wherein a modulation method for the electrical signal includes one of the following:
receiving a same frequency set of electrical signals sequentially in time-sharing manner to determine whether one of the eraser electrodes emits electrical signal in each period;
receiving an electrical signal containing a status message from at least one of the first electrodes and the second electrodes simultaneously;
receiving different frequency sets of electrical signals emitted from different eraser electrodes simultaneously; and
receiving two different frequency sets of electrical signals emitted from one of the at least three eraser electrodes sequentially in time-sharing manner.

13. A touch sensitive system for detecting an electronic board eraser, comprising:
a touch panel, including parallel first electrodes and parallel second electrodes, each of the first electrode intersects with the second electrodes to form multiple intersection areas; and
a touch sensitive processing apparatus connecting to the touch panel, comprising:
a driving circuit connecting to the first electrodes;
a sensing circuit connecting to the first electrodes and the second electrodes; and
a processor connecting to the driving circuit and the sensing circuit, wherein the processor is configured to execute a program module for realizing the following steps:
having the driving circuit emit a beacon signal via the first electrodes simultaneously;
having the sensing circuit detect electrical signal emitted from at least three eraser electrodes of the electronic board eraser via the first and the second electrodes after a time period since the beacon signal is emitted;

detecting positions of the at least three eraser electrodes when the electrical signals emitted from the at least three eraser electrodes of the electronic board eraser are detected, wherein at least three distances among the at least three eraser electrodes are different; and calculating an erasing area of a surface of the touch panel being projected onto by a curvy and elastic wiping surface of the electronic board eraser according to the positions of the at least three eraser electrodes.

\* \* \* \* \*